United States Patent [19]

Walton

[11] Patent Number: 5,048,271
[45] Date of Patent: Sep. 17, 1991

[54] BALE WRAPPING MACHINE

[76] Inventor: John D. Walton, Newton Lodge, Mickleton, Barnard Castle, Co. Durham, DL 12 OLG, England

[21] Appl. No.: 593,233

[22] Filed: Oct. 5, 1990

[51] Int. Cl.$^5$ .............................................. B65B 11/04
[52] U.S. Cl. ...................................... 53/587; 53/588; 53/118; 53/211
[58] Field of Search ................. 53/556, 587, 588, 211, 53/118

[56] References Cited

U.S. PATENT DOCUMENTS 4,821,486  4/1989  Olestad ................................. 53/556

FOREIGN PATENT DOCUMENTS 2187430  9/1987  United Kingdom .................. 53/587
2188587  10/1987  United Kingdom .................. 53/118

Primary Examiner—John Sipos
Attorney, Agent, or Firm—Abelman Frayne Rezac & Schwab

[57] ABSTRACT

A machine for wrapping cylindrical bales comprises an open-fronted wheeled frame for attachment to a towing vehicle, a roller extending transversely of the rear of the frame, and a pair of semi-rollers mounted at or adjacent the forward free end of each side member of the frame to be pivotal between an inoperative position extending fore and aft of the frame and an operative position extending transversely across the open front of the frame, in which position a bale within the frame is rotatably supported by the rear roller and the front semi-rollers. During this rotation of the bale, the bale is wrapped in stretchable film material by a wrapping mechanism on the machine, on completion of which wrapping the semi-rollers are raised relative to the frame to tip the wrapped bale rearwardly of the machine over the rear roller and onto the ground.

6 Claims, 4 Drawing Sheets

BALE WRAPPING MACHINE

BACKGROUND OF THE INVENTION

This invention relates to machines for wrapping bales, more particularly so-called big round bales, in a stretch/cling film to prevent the ingress of air to the hay and thereby to improve the quality of the silage.

It is now conventional practice to utilise baling machines to produce big round bales of hay, typically of the order of four to six feet in diameter and four feet in length, and to wrap the bales so formed in a stretch/cling film of plastic for storage purposes.

Various mechanisms are known for wrapping the film around the bales, all such mechanisms wrapping the bales as an entirely separate operation from the baling procedure either by picking the bales up in the field in which they have previously been deposited by the baler, wrapping them and then leaving them in the field, or wrapping the bales at a predetermined site, typically a stack yard, to which the bales have previously been transported.

However, the quality of the silage is, to a large extent, governed by how quickly air is excluded from the baled hay-13 clearly transportation to a stack yard or the like prior to wrapping enables the air to get to the hay and reduces the quality of the silage.

Wrapping in the field is therefore to be preferred. However existing mechanisms treat the wrapping operation as an entirely separate stage from the baling operation, and there is inevitably a delay between the steps of producing the bale and the wrapping thereof, interposed between which are the steps of lifting the bale from the ground prior to wrapping and returning the wrapped bale onto the ground after wrapping. This overall operation, as well as being time-consuming, requires the presence of manual labour and involves susbstantial handling of the bale in a manner which can damage the bale and/or the film applied thereto.

SUMMARY OF THE INVENTION

It is an object of the invention to provide a bale wrapping machine capable of automatically wrapping a bale as and when it is discharged from the baler.

According to the present invention there is provided a bale wrapping machine comprising an open-fronted, wheeled frame adapted to be located about a cylindrical bale to be wrapped, one or more co-axial rollers extending transversely of said frame at or adjacent the rear thereof, and a pair of semi-rollers one mounted at each side of the frame to be pivotal between an inoperative position extending substantially fore and aft of the frame and an operative position extending transversely of the frame at or adjacent the open front end thereof, the arrangement being such that, with the semi-rollers in their inoperative positions, the frame is located about the bale with the or each rear roller engaging a region of the circumference of the bale, the semi-rollers then being moved to their operative positions to engage an opposite region of the circumference of the bale and whereby the bale is supported on, for rotation by, the front and rear rollers, the machine further comprising a wrapping mechanism adapted to wrap the rotating bale in stretchable film material, the semi-rollers, on completion of the wrapping operation, being movable upwardly from their operative positions to displaced positions whereby the wrapped bale is tipped from the machine rearwardly over the or each rear roller.

It will be appreciated that such a machine enables a bale to be wrapped entirely automatically, the machine conveniently being hitched to the rear of a baler whereby the bales are wrapped as and when they emerge from the baler. Clearly such an arrangement minimises the time during which the bale is subjected to the atmosphere and therefore ensures high quality silage.

Some only of the rear roller or rollers and the semi-rollers may be driven, although in a preferred embodiment all the rollers are driven, the external surfaces of said rollers conveniently being configured to improve frictional contact with the bale.

Preferably the machine comprises an open-fronted sub-frame mounted in the wheeled frame, the semi-rollers being mounted at or adjacent the free ends of the side members of the sub-frame to be pivotal between their inoperative positions and their operative positions by means of associated hydraulic rams reacting between said side members of the sub-frame and the semi-rollers.

Conveniently the sub-frame is mounted in the wheeled frame to be pivotal relative to the wheeled frame about an axis parallel with and closely adjacent the rear transverse member of the sub-frame, one or more hydraulic rams reacting between the wheeled frame and the sub-frame to effect said pivoting movement of the sub-frame and whereby the semi-rollers are raised from their operative positions to their displaced positions.

Preferably one side member of the wheeled frame extends forwardly beyond the open front of the frame to comprise a drawbar to enable attachment of the machine to a baler or towing vehicle.

DESCRIPTION OF THE PREFERRED EMBODIMENT

Figure 1:
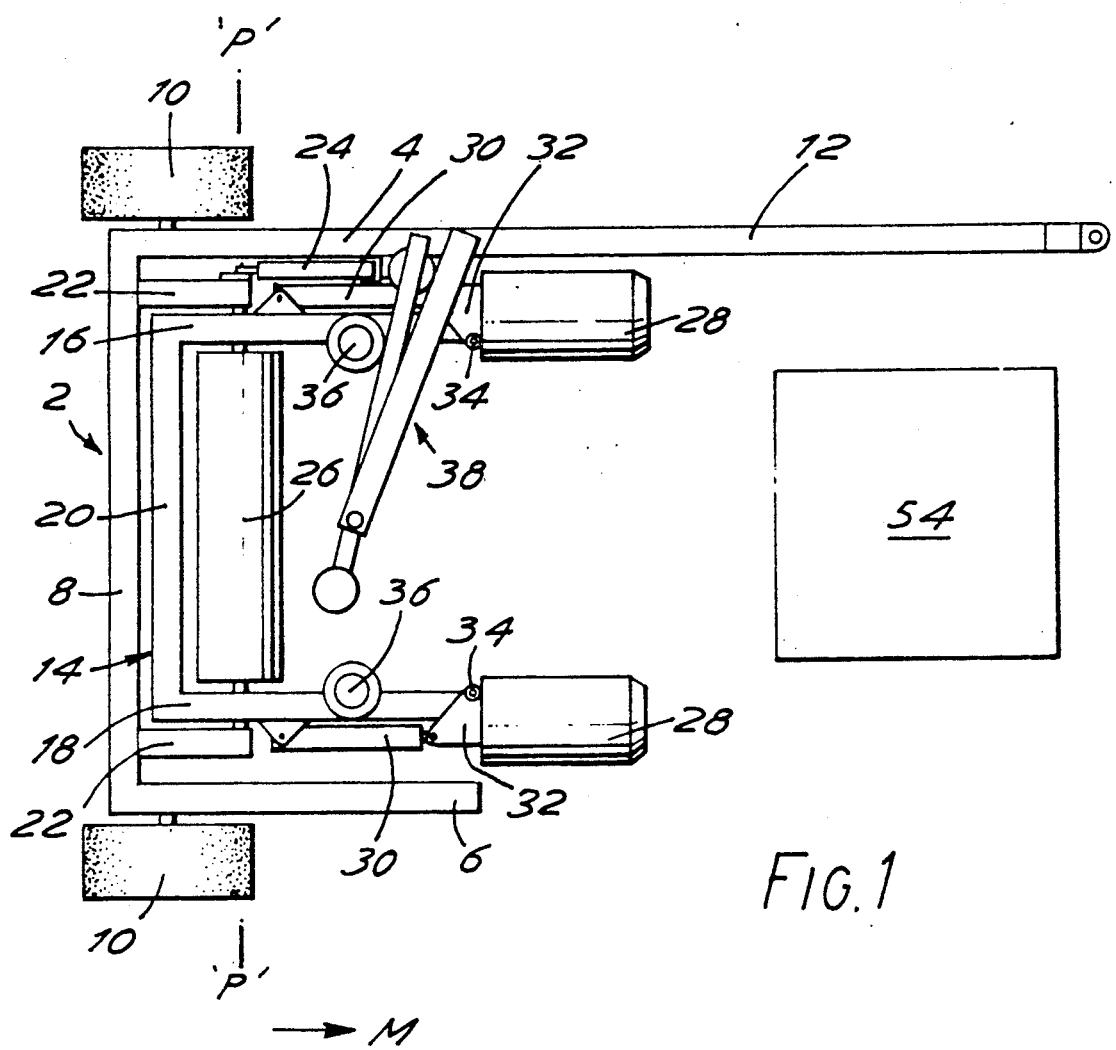
FIGS. 1 and 2 are a plan view and a side view respectively of a machine according to the invention with the semi-rollers in their inoperative positions.

Referring to the drawings the illustrated bale wrapping machine comprises a main frame 2 including opposed side members 4,6 and a rear member 8 defining an open front to the frame 2. The frame 2 is mounted on a pair of rear wheels 10 and the side member 4 is extended forwardly of the frame 2 to define a drawbar 12 by which the frame 2 can be attached to a towing vehicle such as a baler.

Mounted within the main frame 2 is a sub-frame indicated generally at 14 and including a pair of opposed side members 16,18 and a rear member 20 defining an open front to the sub-frame 14.

More particularly the sub-frame 14 is mounted on a pair of support members 22 secured to and projecting forwardly from the rear member 8 of the main frame 2, the sub-frame being pivotal about a horizontal axis P—P extending parallel with and just in front of the rear member 20 thereof by means of a hydraulic ram 24 reacting between the main frame 2 and the sub-frame 14 through a pivot shaft as will be described in more detail below.

A roller 26 extends between the side members 16,18 of the sub-frame 14 adjacent the rear member 20 thereof, the axis of said roller 26 coinciding with the horizontal pivot axis P—P of the sub-frame 14, and the roller 26 being driven by a hydraulic motor. The external surface of the roller 26 is provided with longitudinal projections thereon to improve contact with a bale as will be detailed below.

Figure 2:
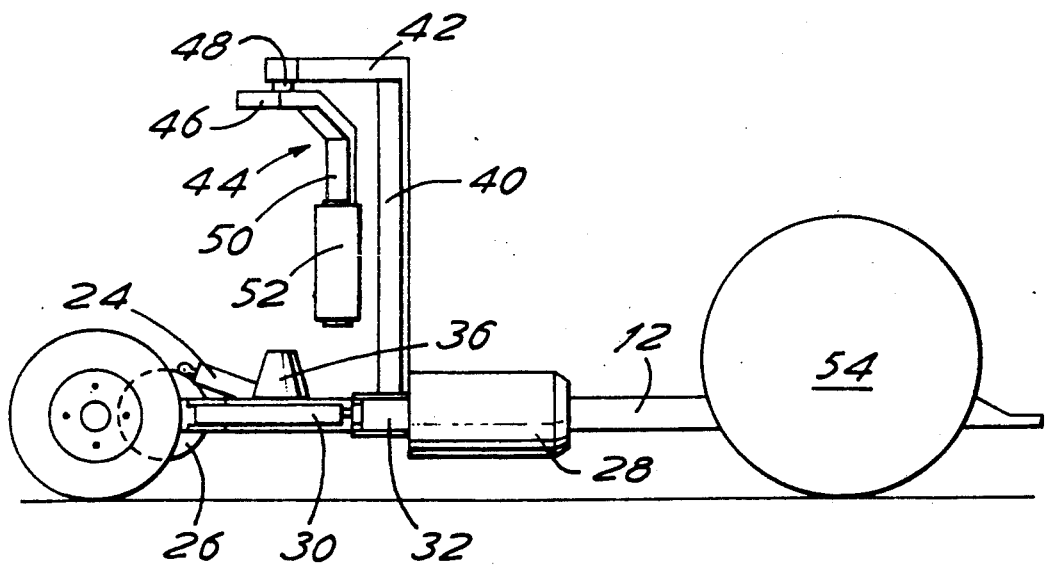
Figure 5:
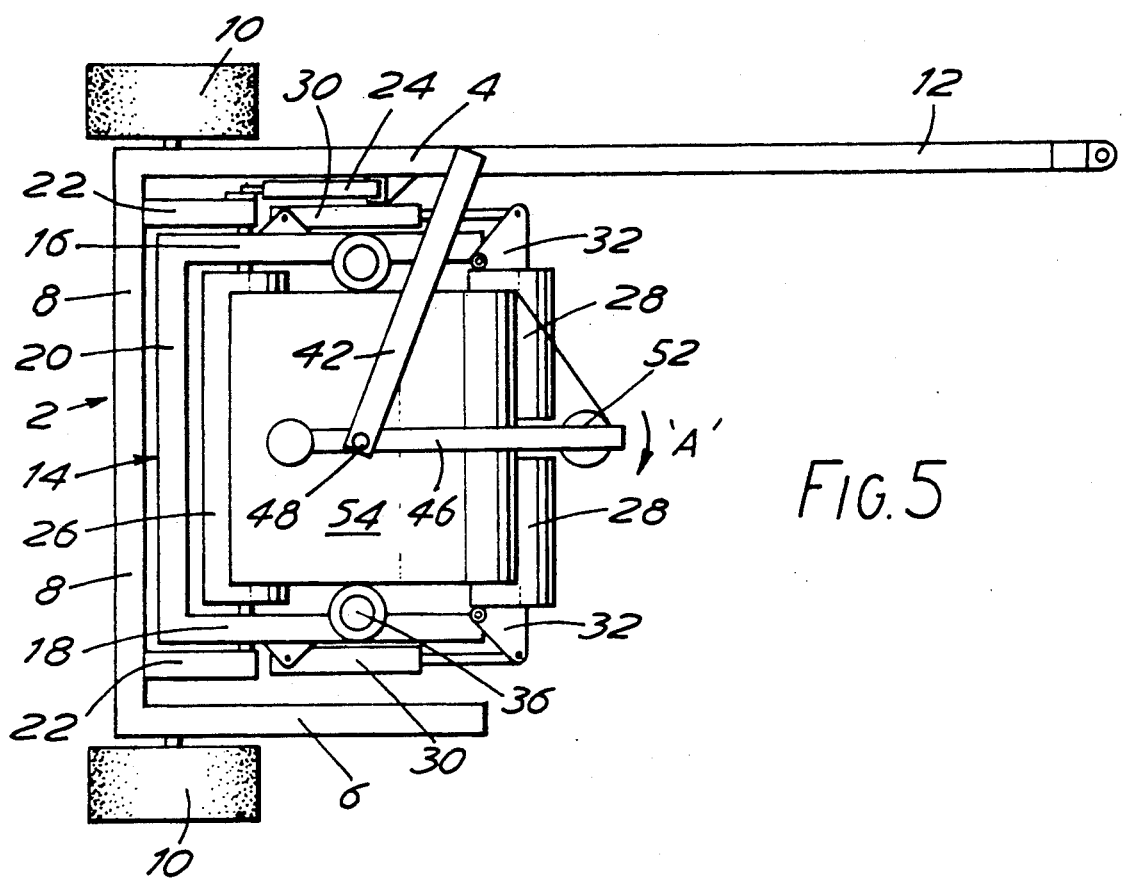
FIGS. 5 and 6 are a plan view and a side view respectively of the machine of FIG. 1 with the semi-rollers in their operative positions.
Figure 6:
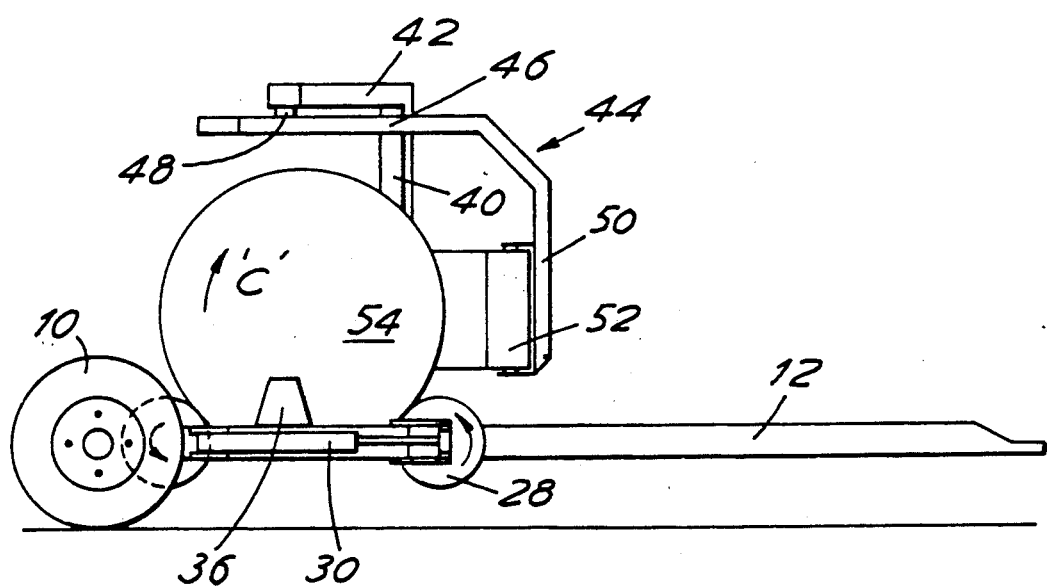

A pair of semi-rollers 28 are pivotally mounted one on the free-end of each of the side member 16,18 of the sub-frame 14, a pair of hydraulic rams 30 reacting between the side members 16,18 and the semi-rollers 28 and being operable to pivot the semi-rollers 28 about vertical axes between inoperative positions extending fore and aft of the sub-frame 14 as seen in FIGS. 1 and 2 and operative positions extending transversely of the sub-frame 14 as seen in FIGS. 5 and 6.

More particularly, each semi-roller 28 is carried on a bracket 32 pivotally mounted at 34 on the free end of the associated side member 16,18, extension of the rams 30 pivoting the brackets 32, together with the semi-rollers 28 carried thereby, about said pivots 34.

As with the roller 26, the semi rollers 28 are provided with longitudinal projections on the external surfaces thereof and are driven by said hydraulic motor, said semi-rollers 28, in the operative positions thereof, extending substantially across the full width of the front open end of the sub-frame and at substantially the same level as the roller 26 above the ground.

A pair of freely rotatable, upwardly projecting rollers 36 are located one intermediate the length of each side member 16,18 of the sub-frame to act as end restraints for a bale carried in the sub-frame as will become apparent from the following description, while a wrapping mechanism indicated generally at 38 is mounted on the main frame.

The wrapping mechanism 38 comprises an upstanding support member 40 having an upper horizontal arm 42 carrying a rotatable wrap arm 44. More particularly, the wrap arm comprises a horizontal portion 46 pivotally mounted at 48 to the arm 42 of the support member 40, and a vertical portion 50 carrying a reel of film 52 and a dispensing mechanism therefor. The wrap arm 44 and reel 52 are rotatable about a vertical axis through the pivot 48 as indicated by the arrow 'A' in FIG. 5 by means of a hydraulic motor.

The described machine is used to wrap a big round bale in stretchable film material as follows.

The machine is hitched to the rear of a baler by means of the drawbar 12 and is set in its bale-receiving condition as shown in FIGS. 1 and 2 with the sub-frame 14 substantially horizontal and with the semi-rollers 28 in their inoperative positions extending fore and aft of the machine along the direction of movement 'M' of the baler.

A big round bale 54 is deposited by the baler in front of the bale wrapping machine as seen in FIGS. 1 and 2, continued movement of the baler drawing the sub-frame 14 around the bale 54 until the roller 26 engages said bale 54.

Figure 3:
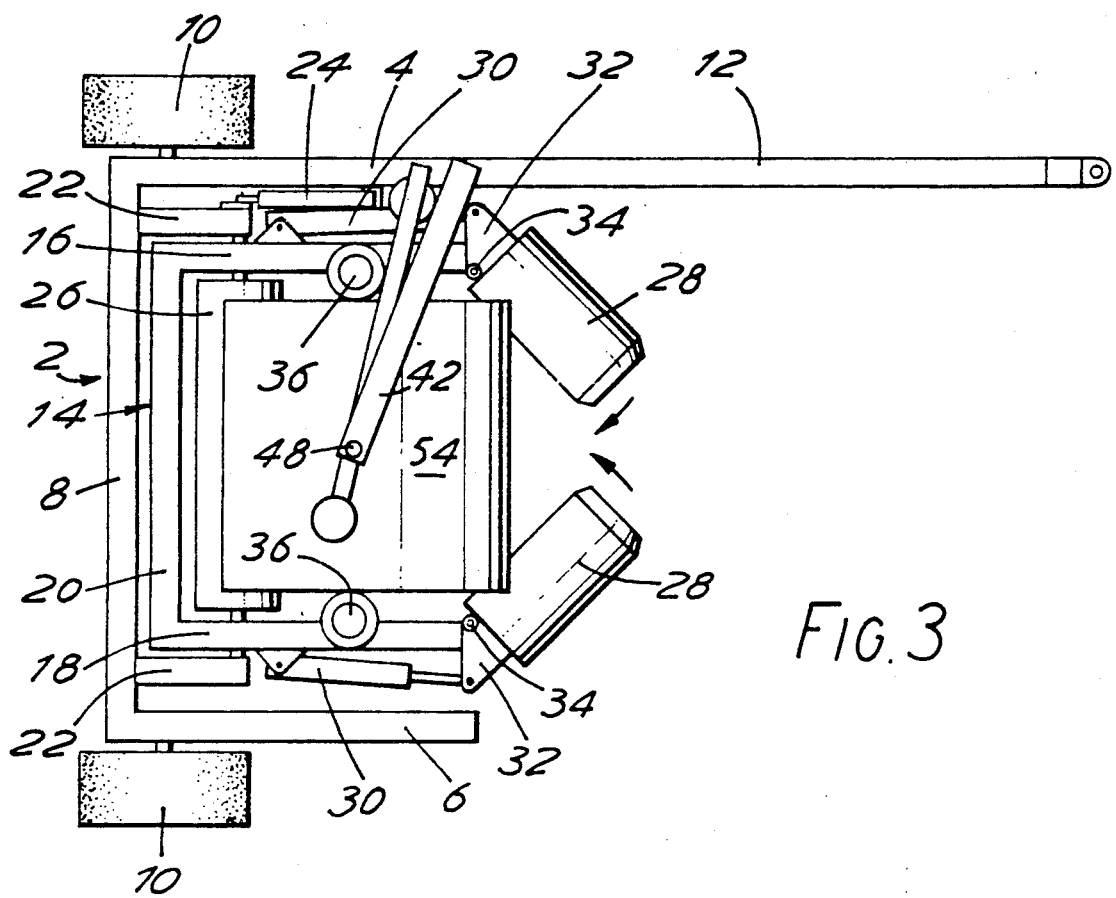
FIGS. 3 and 4 are a plan view and a side view respectively of the machine of FIG. 1 with the semi-rollers partially pivoted towards their operative positions.
Figure 4:
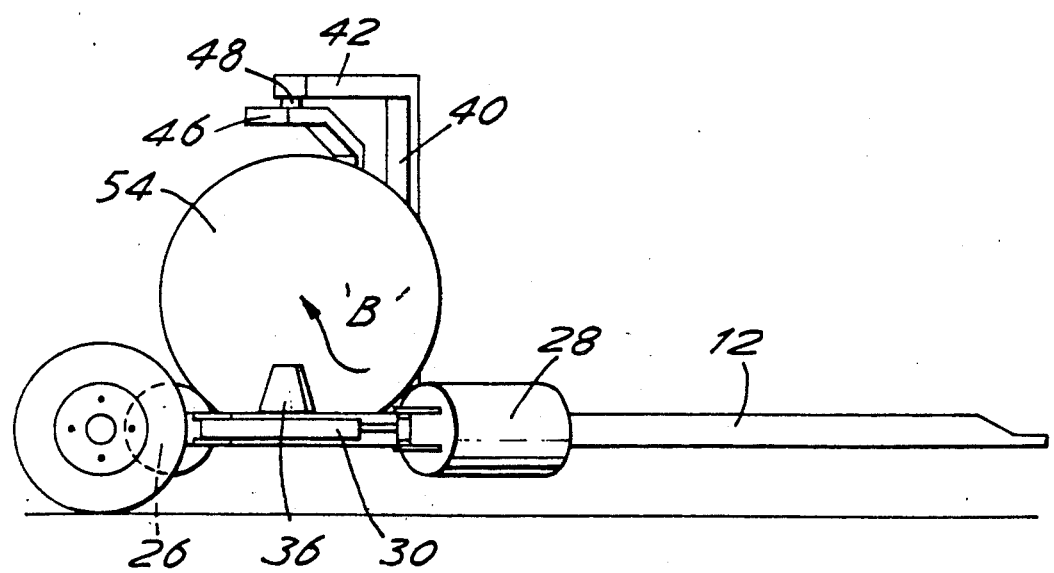
Figure 7:
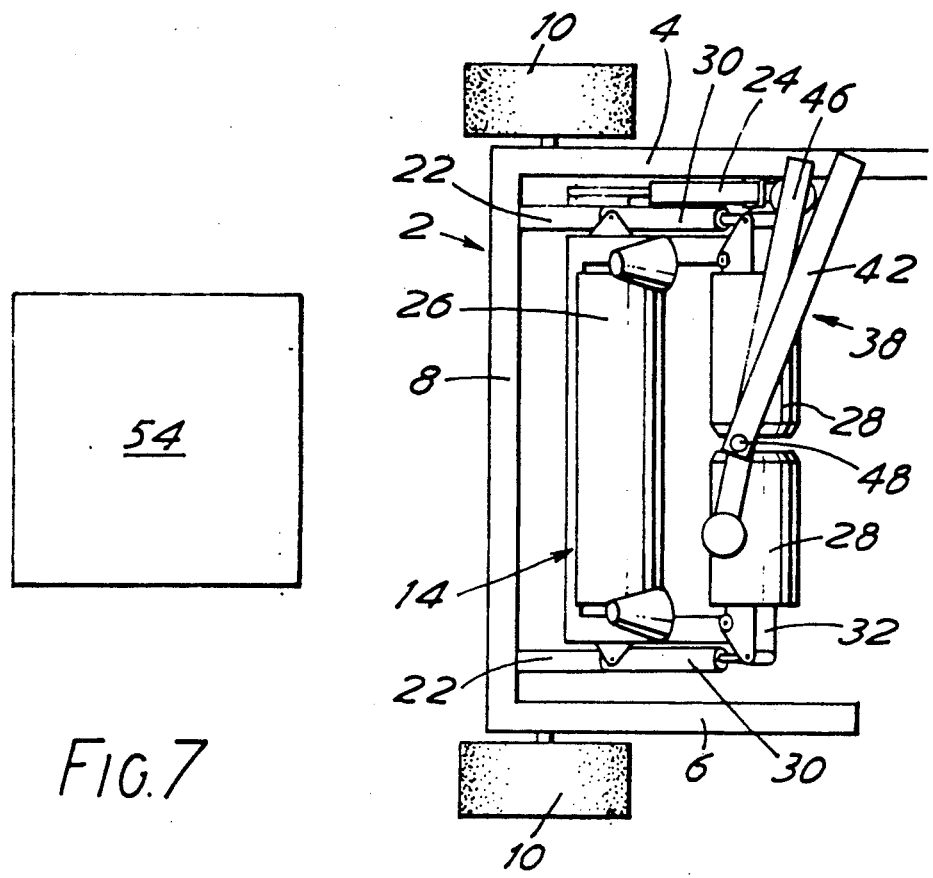
FIGS. 7 and 8 are a plan view and a side view respectively of the machine of FIG. 1 with the semi-rollers in their displaced positions.

At this stage, the hydraulic rams 30 are actuated to pivot the semi-rollers 28 as seen in FIGS. 3 and 4 towards their operative positions, said semi-rollers 28 engaging under the bale 54 whereby said semi-rollers 28, in conjunction with the rear roller 26, raise the bale 54 upwardly and rearwardly of the machine as indicated by arrow 'B' in FIG. 4 into the position shown in FIGS. 6 and 7 in which it is supported above the ground by said roller 26 and semi-rollers 28.

The roller 26 and the semi-rollers 28 are all driven in an anti-clockwise direction as viewed in FIG. 6 whereby the bale 54 supported thereon is rotated in a clockwise direction as indicated by arrow 'C' in FIG. 6, the rollers 36 engaging the ends of the bale 54 and serving to maintain the bale 54 centrally of the machine.

As the bale 54 is being rotated about a horizontal axis on the machine, the wrapping mechanism 38 is actuated whereby the reel of film is rotated around the bale about a vertical axis through the pivot 48 and whereby the bale 54 is wrapped in relatively conventional manner in a stretchable film of plastics material. The speed of rotation of the wrap arm 44 and the reel 52 carried thereby is correlated with the speed of rotation of the bale 54 to ensure that the bale is totally encased in overlapping extents of the plastics film.

Figure 8:
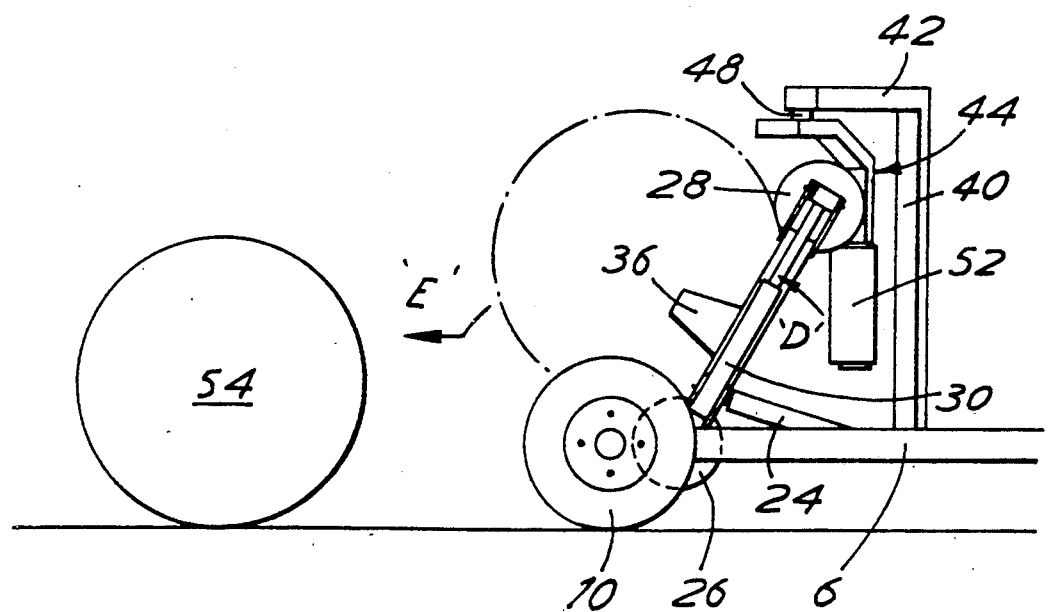

Once the bale 54 has been completely wrapped, the film is severed and the hydraulic ram 24 is activated to pivot the sub-frame 14 in an anti-clockwise direction as viewed in FIG. 8 about the axis P—P and as indicated by the arrow B. The semi-rollers 28 are raised by the sub-frame 14 to the displaced positions shown in FIG. 8 while the rear roller 26 remains undisplaced, the wrapped bale 54 thus being tipped off the sub-frame 14 to roll under gravity from the machine and onto the ground behind the machine as indicated by arrow 'E' in FIG. 8.

Once the bale 54 has been ejected from the machine, the hydraulic circuitry thereof is actuated to return the components of the machine back to the configuration of FIGS. 1 and 2 ready to receive another bale from the baler.

Thus it will be appreciated that the described machine enables a bale to be collected, wrapped and ejected entirely automatically and without the necessity for any supplementary handling or manual assistance.

Although preferably being attached to the rear of a baler whereby the bales are wrapped immediately on emergence from the baler, the machine of the invention may be towed by any suitable prime mover, such as a tractor. Further, the bale can be wrapped on the move, there being no need to stop the prime mover before or during the wrapping operation—the bale is merely moved forwards on engagement by the roller 26 until it is lifted off the ground by the semi-rollers 28.

The precise construction of the machine may vary from that described and illustrated without departing from the scope of the invention. Some only of the roller 26 and semi-rollers 28 may be driven, while the roller 26 may comprises a plurality of co-axial sub-rollers rather than the axially continuous roller shown.

Conveniently separate hydraulic motors are provided one for driving the roller 26 and the semi-rollers 28 and one for driving the wrapping mechanism, although said motors are contained in the same hydraulic circuit and the speeds thereof can be adjusted to effect a desired overlap of film.

The provision of a side-mounted drawbar 12 enables the machine to be manoeuvred about a bale by the towing vehicle without difficulty.

The roller 26 and the semi-rollers 28 may be fabricated with the longitudinal external shapings integrally formed therewith, or may comprise cylindrical members to the external surfaces of which are attached axial slats or the like.

Other modifications and variations from the described and illustrated arrangement will be apparent to those skilled in the art.

What I claim and desire to secure by Letters Patents is:

1. A bale wrapping machine comprising a wheeled frame, a wrapping mechanism mounted on said wheeled frame and adapted to wrap a rotating cylindrical bale carried on the frame in stretchable film material, said wheeled frame being open-fronted and adapted to be located about the bale to be wrapped, at least one roller extending transversely of said frame adjacent the rear thereof, and a pair of semi-rollers one mounted at each side of the frame to be pivotal between an inoperative position extending substantially fore and aft of the frame and an operative position extending transversely of the frame adjacent the open front end thereof, the arrangement being such that, with the semi-rollers in their inoperative positions, the frame is located about the bale with the at least one rear roller engaging a region of the circumference of the bale, the semi-rollers then being moved to their operative positions to engage an opposite region of the circumference of the bale and whereby the bale is supported on, for rotation by, the at least one rear roller and the front semi-rollers, the wrapping mechanism being operable to wrap the rotating bale, the semi-rollers, on completion of the wrapping operation, being movable upwardly from their operative positions to displaced positions whereby the wrapped bale is tipped from the machine rearwardly over the at least one rear roller.

2. A machine as claimed in claim 1 in which the at least one rear roller and the semi-rollers are all driven.

3. A machine as claimed in claim 1 and including configurations on the external surfaces of the at least one rear roller and the semi-rollers to improve frictional contact with the bale.

4. A machine as claimed in claim 1 and comprising an open-fronted sub-frame having side members with free ends and being mounted in the wheeled frame, the semi-rollers being mounted adjacent the free ends of the side member of the sub-frame, associated hydraulic rams reacting between said side members of the sub-frame and the semi-rollers to pivot said semi-rollers between their inoperative positions and their operative positions.

5. A machine as claimed in claim 4 in which the sub-frame is mounted in the wheeled frame to be pivotal relative to the wheeled frame about an axis parallel with and closely adjacent the rear transverse member of the sub-frame, at least one hydraulic ram reacting between the wheeled frame and the sub-frame to effect said pivoting movement of the sub-frame and whereby the semi-rollers are raised from their operative positions to their displaced positions.

6. A machine as claimed in claim 1 in which the wheeled frame includes opposed side members, one of said side members extending forwardly beyond the open front of the frame to comprise a drawbar to enable attachment of the machine to a towing vehicle.

* * * * *